United States Patent
Wu et al.

(10) Patent No.: US 10,962,976 B1
(45) Date of Patent: Mar. 30, 2021

(54) MOTION CONTROL METHOD AND SYSTEM FOR BIOMIMETIC ROBOTIC FISH BASED ON ADVERSARIAL STRUCTURED CONTROL

(71) Applicant: INSTITUTE OF AUTOMATION, CHINESE ACADEMY OF SCIENCES, Beijing (CN)

(72) Inventors: Zhengxing Wu, Beijing (CN); Junzhi Yu, Beijing (CN); Shuaizheng Yan, Beijing (CN); Jian Wang, Beijing (CN); Min Tan, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/094,820

(22) Filed: Nov. 11, 2020

Related U.S. Application Data

(63) Continuation of application No. PCT/CN2020/085045, filed on Apr. 16, 2020.

(30) Foreign Application Priority Data

Nov. 29, 2019 (CN) .......................... 201911199839.1

(51) Int. Cl.
  *G05D 1/00* (2006.01)
  *B63G 8/00* (2006.01)
  (Continued)

(52) U.S. Cl.
  CPC ............ *G05D 1/0088* (2013.01); *B63G 8/001* (2013.01); *G05D 1/10* (2013.01); *G06N 3/008* (2013.01); *B63G 2008/004* (2013.01)

(58) Field of Classification Search
  CPC ........ G05D 1/0088; G05D 1/10; B63G 8/001; B63G 2008/004; G06N 3/008
  See application file for complete search history.

(56) References Cited

U.S. PATENT DOCUMENTS

2009/0125285 A1    5/2009   Gugaliya et al.

FOREIGN PATENT DOCUMENTS

| CN | 104002948 A | 8/2014 |
| CN | 104881045 A | 9/2015 |

(Continued)

OTHER PUBLICATIONS

Yi et al., Motion Control and Motion Coordination of Bionic Robotic Fish: A Review, 2018, Springer, Journal of Bionic Engineering, pp. 579-598 (Year: 2018).*

(Continued)

*Primary Examiner* — Sze-Hon Kong
(74) *Attorney, Agent, or Firm* — Bayramoglu Law Offices LLC

(57) ABSTRACT

A motion control method and system for a biomimetic robotic fish based on an adversarial structured control, includes: taking the accuracy and speed of motion to the target point as a reward term, and taking a power sum of servomotors as a loss term to construct an optimization objective function; optimizing parameters of a central pattern generator model that generates a global control quantity of a servomotor, after curing its parameters, optimizing the parameters of the servomotor compensation control model; iteratively optimizing the parameters of the model; obtaining the global control signal and compensation control signal of the biomimetic robotic fish through the trained model, and using the linear combination of the two sets of output signals as the control signal of the servomotor of the robotic fish to realize the motion control of the fish.

20 Claims, 3 Drawing Sheets

(51) Int. Cl.
*G06N 3/00* (2006.01)
*G05D 1/10* (2006.01)

(56) References Cited

FOREIGN PATENT DOCUMENTS

| CN | 110286592 A | 9/2019 |
|---|---|---|
| CN | 110488611 A | 11/2019 |
| CN | 110909859 A | 3/2020 |

OTHER PUBLICATIONS

Ren et al., A Motion Control Approach for A Robotic Fish with Iterative Feedback Tuning, 2015, IEEE Xplore, pp. 40-45 (Year: 2015).*

Verma et al., Efficient Collective Swimming by Harnessing Vortices Through Deep Reinforcement Learning, Jun. 5, 2018, PNAS, vol. 115, No. 23, pp. 5849-5854 (Year: 2018).*

Ren et al. A Data-driven Motion Control Approach for a Robotic Fish, 2015, ScienceDirect, Journal of Bionic Engineering 12 (2015), pp. 382-394 (Year: 2015).*

Dan Xia et al., Dynamic Modeling of a Fishlike Robot with Undulatory Motion Based on Kane's Method, Journal of Mechanical Engineering, 2009, pp. 42-49, vol. 45, No. 6.

Guo Shunli et al., Steady-State Velocity Modeling of Robot Fish Swimming Straight Based on GRNN, Ordnance Industry Automation, 2010, pp. 82-96, 29(11).

Ming Wang et al., Central Pattern Generator Based Control and Implementation for a Pectoral-fin Propelled Robotic Fish, Robot, 2010, pp. 249-255, vol. 32, No. 2.

Sergey Levine et al., Learning hand-eye coordination for robotic grasping with deep learning and large-scale data collection, The International Journal of Robotics Research, 2018, pp. 421-436, 37(4-5).

Frederik Ebert et al., Self-Supervised Visual Planning with Temporal Skip Connections, 1st Conference on Robot Learning, 2017, pp. 1-13.

Vitchyr Pong et al., Temporal Difference Models: Model-Free Deep RL for Model-Based Control, Published as a conference paper at ICLR, 2018, pp. 1-14.

Mario Srouji et al., Structured Control Nets for Deep Reinforcement Learning, 2018.

* cited by examiner

US 10,962,976 B1

MOTION CONTROL METHOD AND SYSTEM FOR BIOMIMETIC ROBOTIC FISH BASED ON ADVERSARIAL STRUCTURED CONTROL

CROSS REFERENCE TO THE RELATED APPLICATIONS

This application is a continuation application of the International Application PCT/CN2020/085045, filed on Apr. 16, 2020, which is based upon and claims priority to Chinese Patent Application No. 201911199839.1, filed on Nov. 29, 2019, the entire contents of which are incorporated herein by reference.

TECHNICAL FIELD

The present invention belongs to the technical field of biomimetic robot control, and specifically relates to a motion control method and system for a biomimetic robotic fish based on adversarial structured control.

BACKGROUND

As an underwater robot, biomimetic robotic fish have become increasingly important in many fields, such as science education, hydrological monitoring, and biological motion analysis. Generally, effective locomotion control effects fast, stable and energy-efficient underwater swimming for a robotic fish. Such control also enables a robotic fish to complete complex tasks with increased accuracy and efficiency. There have been numerous recent advances in optimizing the methods with which biomimetic robotic fish move.

In early stage research, different dynamic models are typically established according to the differences of biomimetic objects of the robotic fish to improve its swimming performance, such as the dynamic modeling of robotic fish undulatory swimming based on Kane's method[1], which provides essential theoretical support for the research of robotic fish motion control. A generalized recurrent neural network identifies a substantial nonlinear relation of robotic fish swimming control with the fish's motion optimization, and straight steady-state swim velocity of the fish is performed according to this relationship[2]. A particle swarm algorithm is used to optimize central pattern generator (CPG) parameters of a biomimetic robotic fish to improve its forward and backward swimming speed and stability[3].

Additionally, deep reinforcement learning (DRL) methods provide an improved algorithm scheme for multi-objective optimization shortcomings under high-dimensional continuous control. Feasibility and accuracy of the application of DRL to real-world robots, however, remains questionable requiring still further research. With respect to the practical application of the DRL algorithm, Levine et al. established a case of large-scale data collection for hand-eye robot training[4]; Ebert et al. used a self-supervised model-based method to enable the manipulator to learn new skills[5]; Pong et al. combined the model-based and model-free training methods, and proposed a temporal difference model with high learning efficiency and stable performance[6]; and Srouji et al. studied the use of structured control networks to improve the inductive bias to improve the sampling efficiency in real robot training[7]. With respect to biomimetic robotic fish, however, because research centering on the high-mobility motion mechanism lacks data, has low real-time performance of visual feedback and computing resources are limited, these large-scale data collection methods have limited utility. Moreover, it is difficult to train the nonlinear control system by using neural networks. In practical applications, therefore, the results are not particularly robust. Thus, a traditional control or simple intelligent control are typically employed in the practical control of biomimetic robotic fish, such as a proportional-integral-derivative controller (PID), a backstepping sliding mode control, and/or fuzzy control.

Prior art systems typically adopt a deep reinforcement learning method to learn the nonlinear control law of biomimetic robotic fish. Due to the lack of data, the low real-time performance of visual feedback and the limitation of computing resources, however, accomplish training is difficult, while the motion control or simple intelligent control adopted by the traditional method of biomimetic fish has low motion efficiency and poor robustness.

As set out in part above, the following publications may be considered technical background information related to the present invention:

[1] Xia Dan, Chen Weishan, Liu junkao, Han Luhui. Dynamic modeling of a fishlike robot with undulatory motion based on Kane's method. Journal of mechanical engineering, 20090615

[2] Guo Shunli, Zhu Qixin, Xie Guangming. Steady-state velocity modeling of robot fish swimming straight based on GRNN. Ordnance industry automation, 20101115.

[3] Wang Ming, Yu Junzhi, Tan min. Central pattern generator based control and implementation for a pectoral-fin propelled robotic fish. Robot, 20100315

[4] Levine S, Pastor P, Krizhevsky A, Ibarz J, Quillen D. Learning hand-eye coordination for robotic grasping with deep learning and large-scale data collection[J]. The International Journal of Robotics Research, 2018, 37(4-5): 421-436.

[5] Ebert F, Finn C, Lee A X, Levine S. Self-supervised visual planning with temporal skip connections[J]. arXiv preprint arXiv:1710.05268, 2017.

[6] Pong V, Gu S, Dalal M, Levine S. Temporal difference models: Model-free deep rl for model-based control[J]. arXiv preprint arXiv:1802.09081, 2018.

[7] Srouji M, Zhang J, Salakhutdinov R. Structured control nets for deep reinforcement learning[J]. arXiv preprint arXiv:1802.08311, 2018.

SUMMARY

In order to solve the above-mentioned shortcomings of existing biomimetic fish control methods based on DRL, namely the problems of high training difficulty, low motion efficiency and poor robustness, the present invention provides a motion control method for a biomimetic robotic fish based on an adversarial structured control. The novel motion control method for the biomimetic robotic fish of the invention includes:

step S10, obtaining a swimming path of the biomimetic robotic fish, and dividing the swimming path into a set of basic subpaths connected sequentially;

step S20, based on a start point and an end point of each subpath in the set of subpaths in sequence, obtaining a global control quantity of each servomotor of the biomimetic robotic fish at a time t through a trained servomotor global control model;

step S30, based on obtained position and pose information of the biomimetic robotic fish at the time t and the global control quantity of each servomotor of the biomimetic robotic fish at the time t, obtaining a compensation control quantity of each servomotor of the biomimetic robotic fish at the time t through a trained servomotor compensation control model;

step S40, summing the global control quantity of each servomotor of the biomimetic robotic fish at the time t and the compensation control quantity of each servomotor of the biomimetic robotic fish at the time t, to obtain a control quantity of each servomotor of the biomimetic robotic fish at a time t+1, and performing a motion control on the biomimetic robotic fish at the time t+1 through the control quantity of each servomotor of the biomimetic robotic fish at the time t+1; and step S50, letting t=t+1, and returning to step S20 until the biomimetic robotic fish reaches the end of the swimming path.

In some preferred embodiments, the servomotor global control model includes a set of servomotor global control submodels, and the servomotor compensation control model includes a set of servomotor compensation control submodels, wherein the set of servomotor global control submodels and the set of servomotor compensation control submodels are constructed for different types of subpaths, and the set of servomotor global control submodels are in a one-to-one correspondence with the set of servomotor compensation control submodels.

In some preferred embodiments, the servomotor global control submodels are constructed based on a CPG model, and the servomotor compensation control submodels are constructed based on a deep deterministic policy gradient (DDPG) network. The servomotor global control submodels and the servomotor compensation control submodels are trained by an iterative adversarial method, and the training method includes:

step B10, constructing an optimization objective function of the servomotor global control submodels and the servomotor compensation control submodels;

step B20, optimizing parameters of the servomotor global control submodels by an evolutionary strategy (ES) algorithm according to a preset gradient descent direction of a first gradient function, until a value of the optimization objective function does not increase or the increased value is lower than a preset first threshold value, to obtain a first servomotor global control submodel;

step B30, based on the parameters of the first servomotor global control submodel, optimizing the parameters of an action strategy network and an action value network in the servomotor compensation control submodels according to a preset gradient descent direction of a second gradient function, until the value of the optimization objective function does not increase or the increased value is lower than the preset first threshold value, to obtain a first servomotor compensation control submodel;

step B40, based on the parameters of the first servomotor compensation control submodel, returning to step B20 to iteratively optimize the parameters of the servomotor global control submodels and the servomotor compensation control submodels, until the value of the optimization objective function does not increase or the increased value is lower than the preset first threshold value, to obtain trained servomotor global control submodels and trained servomotor compensation control submodels.

In some preferred embodiments, the objective function is expressed as follows:

$$\max J_\psi = \cos(\theta_e) \cdot \vec{v}_m - \beta \cdot \vec{\tau} \cdot \dot{\vec{\theta}}_j, \ s.t. \|\vec{v}_m\| \leq v_0;$$

where, $\psi$ represents an object optimized by the objective function, namely a parameter of the CPG model and a parameter of the DDPG network; $\theta_e$ represents a yaw angle between the biomimetic robotic fish and a target point, and $\theta_e \in (-\pi, \pi]$ is its setting range; $\vec{v}_m$ represents a velocity vector of the biomimetic robotic fish under the world reference system; $\|\vec{v}_m\|$ represents a modulus of the velocity vector, $v_0$ is a preset velocity upper limit configured to ensure the effect of energy consumption optimization; $\vec{\tau}$ and $\dot{\vec{\theta}}_j$ represent a torque vector and an angular velocity vector of the servomotor of the biomimetic robotic fish, respectively; $\beta$ is a positive value and indicates a correlation coefficient between reward and loss.

In some preferred embodiments, the first gradient function is expressed as:

$$\nabla_\theta E_{E \sim N(0,I)} F(\theta + \sigma \varepsilon) = \frac{1}{\sigma} E_{E \sim N(0,I)} \{F(\theta + \sigma \varepsilon)\varepsilon\};$$

where, $F(\cdot)$ represents the optimization objective function, $\theta$ represents the parameter of the CPG model, $\sigma$ represents a step size of parameter perturbation, $\varepsilon$ represents a gradient direction of the parameter perturbation, and $E_{E \sim N(0,I)}$ represents a mathematical expectation of the optimization objective function obtained by the motion of the biomimetic robotic fish under the control of $\theta$ updated in n gradient directions sampled from a standard normal distribution.

In some preferred embodiments, the second gradient function is expressed as:

$$\nabla_{\theta^\mu} J \approx \frac{1}{N} \sum_i \nabla_a Q(s, a|\theta^Q)|_{s=s_i, a=\mu(s_i)} \nabla_{\theta^\mu} \mu(s|\theta^\mu)|_{s_i};$$

where, $Q(s,a|\theta^Q)$ represents an action state value function, $\mu(s|\theta^\mu)$ represents an action strategy function, N represents the number of samples in a batch update method, i represents the $i^{th}$ sample sampled from an experience pool, a represents a control quantity, $S_i$ represents a state of the $i^{th}$ sample, J represents an objective function of the action strategy network, and $\nabla_{\theta^\mu}$ represents a gradient of the action strategy network with respect to the parameters in the network.

In some preferred embodiments, a method of "summing the global control quantity of each servomotor of the biomimetic robotic fish at the time t and the compensation control quantity of each servomotor of the biomimetic robotic fish at the time t" in step S40 is:

$$a_t = u_t^s + u_t^e = a_t^g(s_t, s_t^d) + a_t^c(s_t, s_t^d);$$

where, $a_t$ represents a control signal of the servomotor of the biomimetic robotic fish; $s_t$ and $s_t^d$ represent a state and an expected state of the biomimetic robotic fish at the time t, respectively; and $a_t^g(s_t, s_t^d)$ and $a_t^c(s_t, s_t^d)$ respectively represent the global control quantity of the servomotor and the compensation control quantity of the servomotor related to the state of the biomimetic robotic fish.

According to the second aspect of the present invention, a motion control system for a biomimetic robotic fish based on an adversarial structured control is provided. The motion control system for the biomimetic robotic fish includes a path acquisition module, a servomotor global control module, a servomotor compensation control module, a servomotor control quantity acquisition module, and a motion control module.

The path acquisition module is configured to obtain a swimming path of the biomimetic robotic fish, and divide the swimming path into a set of basic subpaths connected sequentially.

The servomotor global control module is configured to obtain a global control quantity of each servomotor of the biomimetic robotic fish at a time t through a trained servomotor global control model based on a start point and an end point of each subpath in the set of subpaths in sequence.

The servomotor compensation control module is configured to obtain a compensation control quantity of each servomotor of the biomimetic robotic fish at the time t through a trained servomotor compensation control model based on obtained position and pose information of the biomimetic robotic fish at the time t and the global control quantity of each servomotor of the biomimetic robotic fish at the time t.

The servomotor control quantity acquisition module is configured to sum the global control quantity of each servomotor of the biomimetic robotic fish at the time t and the compensation control quantity of each servomotor of the biomimetic robotic fish at the time t, to obtain a control quantity of each servomotor of the biomimetic robotic fish at a time t+1.

The motion control module is configured to perform a motion control on the biomimetic robotic fish at the time t+1 through the control quantity of each servomotor of the biomimetic robotic fish at the time t+1.

According to the third aspect of the present invention, a storage device is provided, wherein a plurality of programs are stored in the storage device, and the programs are configured to be loaded and executed by a processor to implement the above-mentioned motion control method for the biomimetic robotic fish based on the adversarial structured control.

According to the fourth aspect of the present invention, a processing device is provided, which includes a processor and a storage device. The processor is configured to execute a plurality of programs. The storage device is configured to store the plurality of programs. The programs are configured to be loaded and executed by a processor to implement the above-mentioned motion control method for the biomimetic robotic fish based on the adversarial structured control.

The advantages of the present invention are as follows.

(1) The motion control method for the biomimetic robotic fish based on the adversarial structured control in the present invention combines the prior knowledge of periodic motion of fish, and uses the CPG model to generate the rhythmic signal as the reference control signal of the robotic fish through the evolutionary strategy (ES). Moreover, the reference control signal is learned in combination with the use of deep reinforcement learning algorithms to perform the joint control of the biomimetic robotic fish, and the generated control law conforms to the sine-like signal of a fish body wave, thus ensuring the high efficiency of robotic fish swimming. Compared with the method of directly using deep reinforcement to learn complex nonlinear control laws, the training and optimization of the CPG model involve fewer parameters, which reduces the difficulty of optimization training.

(2) The motion control method for the biomimetic robotic fish based on the adversarial structured control in the present invention puts forward a corresponding objective function for the energy-saving motion optimization task to realize the complex requirements for the robotic fish to complete the motion target while reducing the motion loss. Additionally, the defect that the traditional heuristic optimization algorithm that it is easy to succumb to the local optimum is improved by an adversarial training method, which further improves the motion efficiency and robustness of the robotic fish.

BRIEF DESCRIPTION OF THE DRAWINGS

By reading the detailed description of the non-restrictive embodiments with reference to the drawings, other features, objectives and advantages of the present invention will be more obvious.

DETAILED DESCRIPTION OF THE EMBODIMENTS

Figure 1:
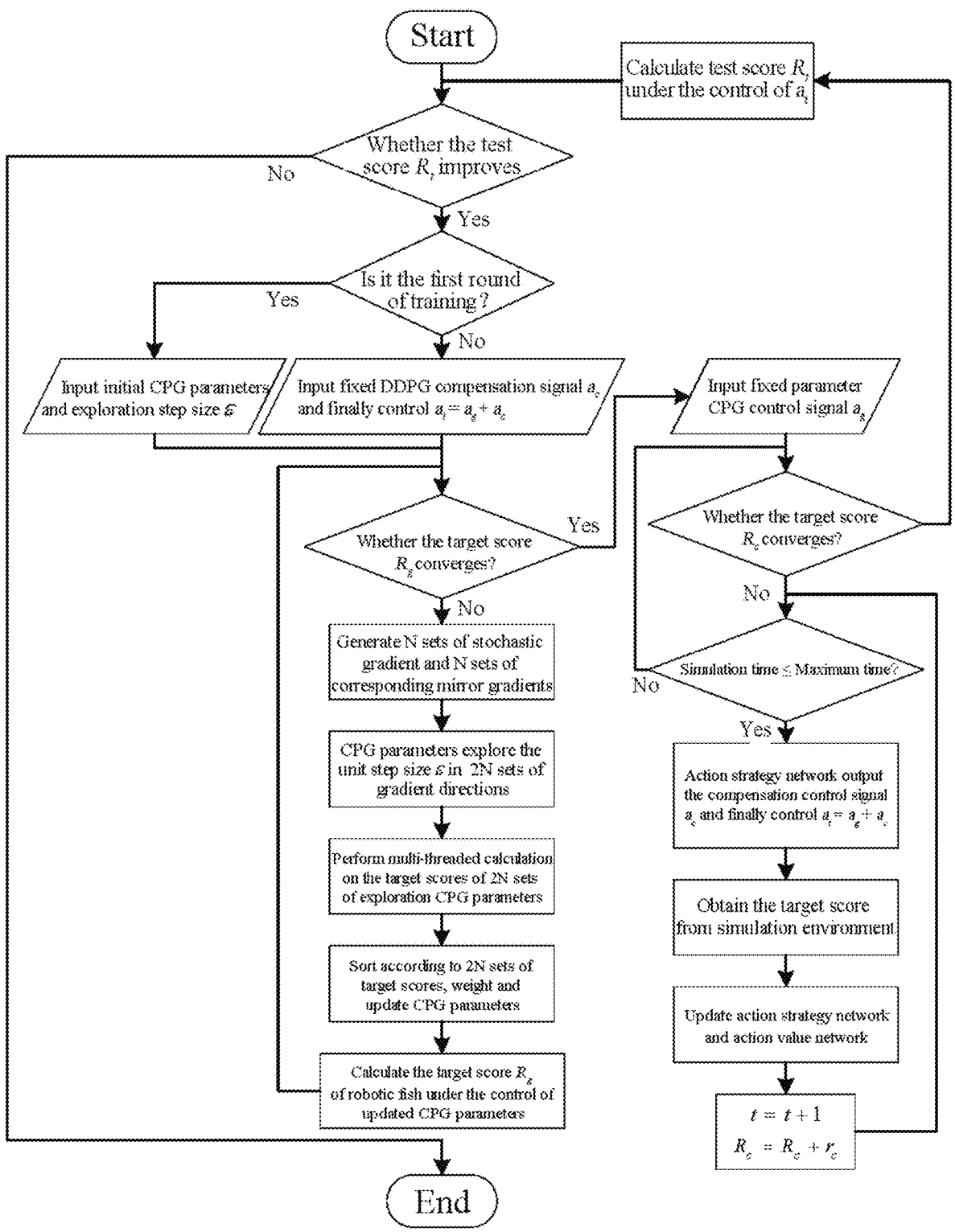
FIG. 1 is a flow chart showing a motion control method for a biomimetic robotic fish based on an adversarial structured control of the present invention.

The present invention will be further described in detail with reference to the drawings and embodiments. It should be understood that the specific embodiments described herein are only used to explain the related invention rather than to limit the present invention. In addition, it should be noted that for the convenience of description, only parts related to the present invention are shown in the drawings.

It should be noted that the embodiments in the present invention and the features in the embodiments may be combined with each other when not in conflict. The present invention will be further described in detail below with reference to the drawings.

A motion control method for a biomimetic robotic fish based on an adversarial structured control of the present invention includes:

step S10, a swimming path of the biomimetic robotic fish is obtained, and the swimming path is divided into a set of basic subpaths connected sequentially;

step S20, based on a start point and an end point of each subpath in the set of subpaths in sequence, a global control quantity of each servomotor of the biomimetic robotic fish at a time t is obtained through a trained servomotor global control model;

step S30, based on obtained position and pose information of the biomimetic robotic fish at the time t and the global control quantity of each servomotor of the biomimetic robotic fish at the time t, a compensation control quantity of each servomotor of the biomimetic robotic fish at the time t is obtained through a trained servomotor compensation control model;

step S40, the global control quantity of each servomotor of the biomimetic robotic fish at the time t and the compensation control quantity of each servomotor of the biomimetic robotic fish at the time t are summed to obtain a control quantity of each servomotor of the biomimetic robotic fish at a time t+1, and a motion control is performed on the biomimetic robotic fish at the time t+1 through the control quantity of each servomotor of the biomimetic robotic fish at the time t+1; and step S50, letting t=t+1, and returning to step S20 until the biomimetic robotic fish reaches the end of the swimming path.

In order to more clearly describe the motion control method for the biomimetic robotic fish based on the adversarial structured control of the present invention, the steps in the embodiments of the present invention are described in detail in combination with FIG. 1.

A motion control method for a biomimetic robotic fish based on an adversarial structured control in one embodiment of the present invention includes steps S10-S50, and each step is described in detail as follows.

Step S10, a swimming path of the biomimetic robotic fish is obtained, and the swimming path is divided into a set of basic subpaths connected sequentially.

Figure 2:
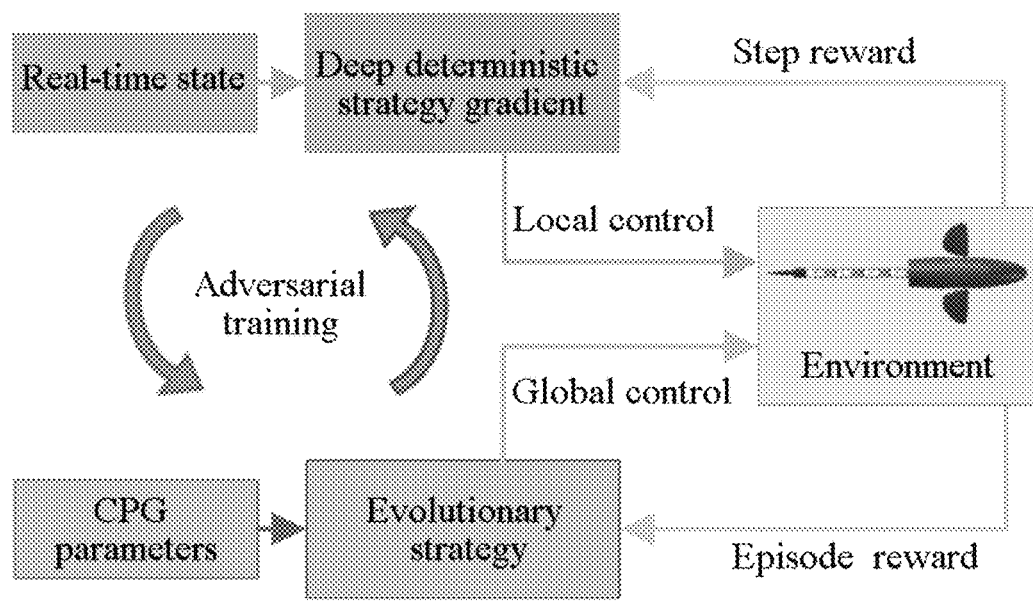
FIG. 2 is a schematic diagram showing an algorithm structure in one embodiment of the motion control method for the biomimetic robotic fish based on the adversarial structured control of the present invention.

FIG. 2 is a schematic diagram showing an algorithm structure in one embodiment of the motion control method for the biomimetic robotic fish based on the adversarial structured control of the present invention. The final control signal of the biomimetic robotic fish is generated by global reference control and local compensation control, respectively. The global reference control is a parameter-optimized CPG model, configured to generate the rhythmic signal as the global reference control signal. The local compensation control is a real-time system trained by DDPG, the input thereof is the real-time position and pose information of the biomimetic robotic fish, and the output thereof is compensation control quantities with the number same as the number of the servomotors based on the position control. Under the control of the global reference signal, the biomimetic robotic fish generates a global movement trend, and the compensation signal helps the robotic fish to fine tune according to the current state based on the reference signal, so as to calibrate the path, improve the motion accuracy and reduce the motion loss.

The whole swimming task of the biomimetic robotic fish can be divided into relatively simple subtasks, and each subtask corresponds to a simple swimming path, such as turning left, turning right, going straight. Between adjacent subtasks, the end point of the previous path is the same as the start point of the next path. Through a plurality of combinations of simple swimming paths, the motion control of complex swimming tasks of the biomimetic robotic fish is realized.

Step S20, based on a start point and an end point of each subpath in the set of subpaths in sequence, a global control quantity of each servomotor of the biomimetic robotic fish at a time t is obtained through a trained servomotor global control model.

Step S30, based on obtained position and pose information of the biomimetic robotic fish at the time t and the global control quantity of each servomotor of the biomimetic robotic fish at the time t, a compensation control quantity of each servomotor of the biomimetic robotic fish at the time t is obtained through a trained servomotor compensation control model.

The servomotor global control model includes a set of servomotor global control submodels, and the servomotor compensation control model includes a set of servomotor compensation control submodels, wherein the set of servomotor global control submodels and the set of servomotor compensation control submodels are constructed for different types of subpaths, and the set of servomotor global control submodels are in a one-to-one correspondence with the set of servomotor compensation control submodels.

The servomotor global control submodels are constructed based on the CPG model, and the servomotor compensation control submodels are constructed based on the DDPG network. The servomotor global control submodels and the servomotor compensation control submodels are trained by an iterative adversarial method, and the training method is as follows.

Step B10, an optimization objective function of the servomotor global control submodels and the servomotor compensation control submodels are constructed, as shown in formula (1):

$$\max J_\psi = \cos(\theta_e) \cdot \vec{v}_m - \beta \cdot \vec{\tau} \cdot \overline{\vec{\theta}_j}, \ s.t. \|\vec{v}_m\| \le v_0 \qquad \text{formula (1);}$$

where, $\psi$ represents an object optimized by the objective function, namely a parameter of the CPG model and a parameter of the DDPG network; $\theta_e$ represents a yaw angle between the biomimetic robotic fish and the target point, and $\theta_e \in (-\pi,\pi]$ is its setting range; $\vec{v}_m$ represents a velocity vector of the biomimetic robotic fish under the world reference system; $\|\vec{v}_m\|$ represents a modulus of the velocity vector, $v_0$ is a preset velocity upper limit configured to ensure the effect of energy consumption optimization; $\vec{\tau}$ and $\overline{\vec{\theta}_j}$ represent a torque vector and an angular velocity vector of the servomotor of the biomimetic robotic fish, respectively; $\beta$ is a positive value and indicates a correlation coefficient between reward and loss.

The motion optimization method provided in the present invention aims at two different models. In order to ensure the consistency of the optimization effect, the provided optimization objective function has generalization.

Step B20, the parameters of the servomotor global control submodels are optimized by an ES algorithm according to a preset gradient descent direction of a first gradient function, until the value of the optimization objective function does not increase or the increased value is lower than a preset first threshold value, to obtain a first servomotor global control submodel.

Generally, biological CPG is a dedicated neural network located in the spinal cord, which has the ability to generate coordinated rhythmic activity patterns, such as breathing, chewing or leg movements during walking. In particular, the CPG model can generate rhythmic signals without any input from feedback or higher control centers. CPG model-based control is widely used to generate various swimming strategies of the robotic fish. Compared with the traditional fish body wave fitting method, the CPG model, as an online gait generator, simply changes the characteristics of the output signal, and can maintain stable and continuous motion even if the parameters change suddenly. Therefore, the global reference control of the present invention also adopts the servomotor global control model constructed based on the CPG model to generate the global control signal of the robotic fish.

In the training stage, the global reference control is taken as an initial optimization object, and the ES algorithm is used to optimize the parameters of the CPG model. The ES algorithm in reinforcement learning is used to perturb the parameters of the CPG model by generating mirrored stochastic gradient. The robotic fish is controlled to move in the environment and get reward feedback of different sizes. Finally, the parameters of the CPG model are updated with different weights according to the reward ranking. The first gradient function is shown in formula (2):

$$\nabla_\theta E_{E \sim N(0,I)} F(\theta + \sigma \varepsilon) = \frac{1}{\sigma} E_{E \sim N(0,I)} \{F(\theta + \sigma \varepsilon)\varepsilon\}; \quad \text{formula (2)}$$

where, F(•) represents the optimization objective function, θ represents the parameter of the CPG model, σ represents a step size of parameter perturbation, ε represents a gradient direction of the parameter perturbation, and $E_{E \sim N(0,I)}$ represents a mathematical expectation of the optimization objective function obtained by the motion of the biomimetic robotic fish under the control of θ updated in n gradient directions sampled from a standard normal distribution.

Figure 3:
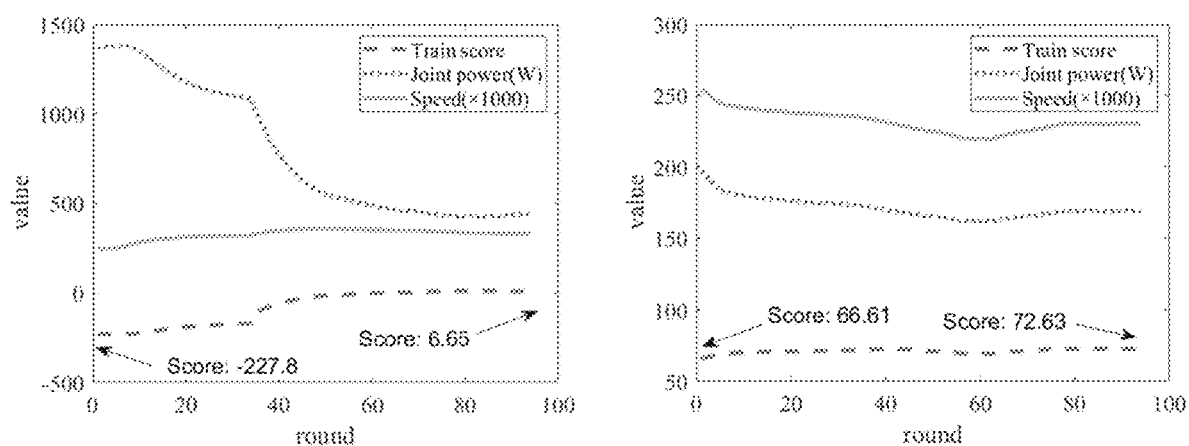
FIG. 3 is a schematic diagram showing simulation training of a Mujoco robotic fish in one embodiment of the motion control method for the biomimetic robotic fish based on the adversarial structured control of the present invention.

For each subpath $L_i$, according to the relationship between an initial pose $S_{start}^i$ and a target point $P_i$ of the robotic fish, a set of initial training values are empirically given, and the training is performed until the score of the objective function converges. The CPG model parameters corresponding to the optimal training results and a termination pose $S_{stop}^i$ of the robotic fish are recorded. FIG. 3 is a schematic diagram showing the simulation training of a Mujoco robotic fish in one embodiment of the motion control method for the biomimetic robotic fish based on the adversarial structured control of the present invention. The left figure of FIG. 3 and the right figure of FIG. 3 are the numerical simulation diagrams of a poor initial CPG model and a good initial CPG model with parameters optimized by the ES algorithm, wherein the short-dashed curve Train score represents the change of the value of the optimization objective function in different training rounds, the dotted curve Joint power (W) represents the change of the total power per unit time in each episode under the different training rounds, the continuous curve Speed (×1000) represents the change of head linear velocity of the robotic fish in the straight swimming task under the different training rounds, the abscissa round represents the number of training rounds, and the ordinate value represents the value of the optimization objective function. The ES algorithm can effectively optimize the initial parameters of the CPG whether they are good or poor. The energy loss of the robotic fish in the swimming process is significantly reduced due to the optimization of the swimming path and posture.

Step B30, based on the parameters of the first servomotor global control submodel, the parameters of the action strategy network and the action value network in the servomotor compensation control submodels are optimized according to a preset gradient descent direction of a second gradient function, until the value of the optimization objective function does not increase or the increased value is lower than the preset first threshold value, to obtain a first servomotor compensation control submodel.

After the first round of optimization of the global reference control, the method of the present invention locks the global reference control signal output by the module, that is, to fix the parameters of the CPG model, and then convert the training object to update the parameters of the action strategy network and the action value network in DDPG. The second gradient function is shown in formula (3):

$$\nabla_{\theta^\mu} J \approx \frac{1}{N} \sum_i \nabla_a Q(s, a|\theta^Q)|_{s=s_i, a=\mu(s_i)} \nabla_{\theta^\mu} \mu(s|\theta^\mu)|_{s_i}; \quad \text{formula (3)}$$

where, $Q(s,a|\theta_Q)$ represents an action state value function, $\mu(s|\theta^\mu)$ represents an action strategy function, N represents the number of samples in a batch update method, i represents the $i^{th}$ sample sampled from an experience pool, a represents a control quantity, $S_i$ represents a state of the $i^{th}$ sample, J represents an objective function of the action strategy network, and $\nabla_{\theta^\mu}$ represents a gradient of the action strategy network with respect to the parameters in the network.

The present invention proposes to use DDPG algorithms to generate a local compensation control signal for real-time control, which is mainly derived from the core idea of residual neural networks: the residual compensation control signal is trained on the control signal that has achieved better results, and the worst result is that the output of the residual control network is zero, which is equivalent to controlling the motion of the robotic fish only through the global reference control signal. Therefore, the weight and the bias of the DDPG action strategy network are both set as 0 in the present invention, and according to the limitation of the maximum rotation angle $\theta_{max}$ per unit time of the robotic fish equipped with the servomotor, the output of the action strategy network is set as shown in formula (4):

$$a_t = K \cdot \tan h(\hat{a}) \quad \text{formula (4);}$$

where, $a_t$ represents an output action signal of the local compensation control at each time, $\hat{a}$ represents an output of an output layer of the action strategy network, and the nonlinear activation function tan h limits the output range to [−1, 1], and K represents an upper limit value of the fine adjustment amount of the compensation signal set according to $\theta_{max}$.

The action strategy network designed by the method of the present invention includes two hidden layers, and each layer contains 64 nodes. The input state dimension is related to the actual number of servomotors of the multi-link robotic fish, and its physical meaning mainly includes: the distance between the current position and the target point $P_i$, the deviation angle between the current position and the target point $P_i$, the current heading angle, the rotation angle of each servomotor, and the rotation angular velocity of each servomotor. The action value network also includes two hidden layers, and each layer contains 64 nodes. State and action jointly constitute the input of the value network by means of vector merging, and the output of the value network is the action state value function $Q_\pi(s,a)$.

In the training stage, DDPG and ES adopt the same optimization objective function, but the ES adopts Monte Carlo methods and takes the total reward of an episode as the feedback score. The DDPG adopts the time difference method, and the network parameters are updated in each step of motion. When the final objective function score converges, the training of the DDPG ends.

Step B40, based on the parameters of the first servomotor compensation control submodel, returning to step B20 to iteratively optimize the parameters of the servomotor global control submodels and the servomotor compensation control submodels, until the value of the optimization objective function does not increase or the increased value is lower than the preset first threshold value, to obtain trained servomotor global control submodels and trained servomotor compensation control submodels.

Figure 4:
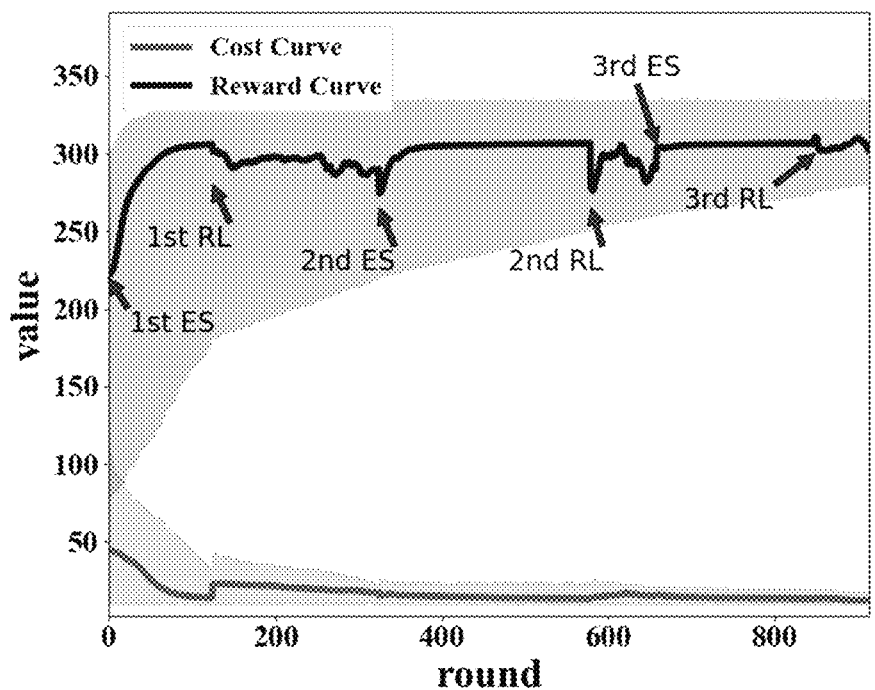
FIG. 4 is a schematic diagram showing numerical simulation training of a real robotic fish in one embodiment of the motion control method for the biomimetic robotic fish based on the adversarial structured control of the present invention.

In the training of adversarial structured control of the method of the present invention, in addition to the initial global reference control obtained by training, the subsequent updating of the CPG model parameters by the ES algorithm also requires fixed DDPG network parameters to be optimized. This adversarial training method proposed by the invention method can effectively avoid the situation that the CPG model parameters and the DDPG network parameters fall into local optimum during the optimization process. FIG. 4 is a schematic diagram showing the simulation training of a real robotic fish in one embodiment of the motion control method for the biomimetic robotic fish based on the adversarial structured control of the present invention, wherein the grey curve, Cost Curve, represents the change of the loss term in the optimization objective function under different adversarial training rounds, the black curve, Reward Curve, represents the change of the reward term in the optimization objective function under the different adversarial training rounds, 1st ES, 2nd ES and 3rd ES respectively, represent the first, second and third time of updating the CPG model parameters by the evolutionary strategy algorithm, 1st RL, 2nd RL and 3rd RL respectively, represent the first, second and third time of updating the DDPG model parameters, the abscissa round represents the number of the adversarial training rounds, and the ordinate value represents the value of the optimization objective function. After each round of ES algorithm optimization and convergence of the benchmark control superimposed on the compensation control, the score of the objective function is improved again. In one embodiment of the present invention, after three rounds of adversarial training, the score of the objective function tends to be stable and does not increase. In addition, as shown in the shadow part of FIG. 4, for different given initial conditions, the method of the present invention can produce obvious motion optimization effects for the biomimetic robotic fish, and obtain a higher task completion degree.

Step S40, the global control quantity of each servomotor of the biomimetic robotic fish at the time t and the compensation control quantity of each servomotor of the biomimetic robotic fish at the time t are summed to obtain a control quantity of each servomotor of the biomimetic robotic fish at a time t+1, and a motion control is performed on the biomimetic robotic fish at the time t+1 through the control quantity of each servomotor of the biomimetic robotic fish at the time t+1.

Control algorithms proposed based on traditional control theory such as PID and active disturbance rejection control (ADRC) generally only focus on the single purpose of reducing tracking error when solving the path tracking problem of biomimetic robotic fish. It is very difficult to solve the control law with high performance and low power consumption by theoretical derivation. Therefore, the method of the present invention transforms the problem of solving the control law into an objective optimization problem to realize the task requirements of high tracking accuracy and low power consumption. Intuitively, according to the prior knowledge of the rhythmic motion of the biomimetic robotic fish, the reference control signal is set as the optimized rhythmic signal. Therefore, the global reference control is designed to optimize the CPG model parameters through the ES, while the compensation control is designed to further optimize and stabilize the local motion of the reference control through the DDPG algorithm. The two signals are linearly combined to form the final control law, as shown in formula (5):

$$a_t = u_t^s + u_t^e = a_t^g(s_t, s_t^d) + a_t^c(s_t, s_t^d) \qquad \text{formula (5)};$$

where, $a_t$ represents a control signal of the servomotor of the biomimetic robotic fish, $s_t$ and $s_t^d$ represent a state and an expected state of the biomimetic robotic fish at the time t, respectively, and $a_t^g(s_t, s_t^d)$ and $a_t^c(s_t, s_t^d)$ respectively represent the global control quantity of the servomotor and the compensation control quantity of the servomotor related to the state of the biomimetic robotic fish.

Step S50, let t=t+1, and returning to step S20 until the biomimetic robotic fish reaches the end of the swimming path.

Figure 5:
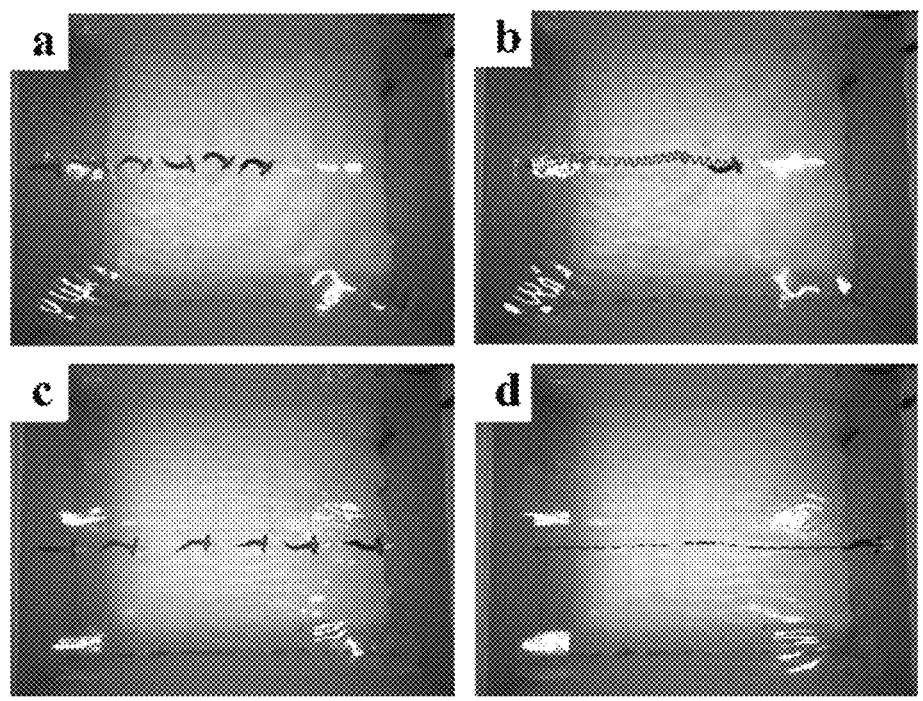
FIG. 5 is a schematic diagram showing straight swimming of a real four-link biomimetic robotic fish with a group of poor initial states after being optimized in one embodiment of the motion control method for the biomimetic robotic fish based on the adversarial structured control of the present invention.

Referring to FIG. 5, a schematic diagram shows straight swimming of a real four-link biomimetic robotic fish with a group of poor initial states after being optimized in one embodiment of the motion control method for the biomimetic robotic fish based on the adversarial structured control of the present invention. It can be seen from FIG. 5(a) that at the beginning of the experiment, the robotic fish is still in the water, and then realizes the straight swimming task with a poor swimming posture. FIG. 5(b) shows that although the robotic fish completes the straight swimming target only under the control of the CPG model, the swing amplitude of the robotic fish is very large, and the path recorded by the global vision system shows zigzag fluctuations. Therefore, the water resistance brought by the motion posture is very high, the motion efficiency is very low, the swimming speed of the biomimetic robotic fish is low, and the energy consumption is very high. FIG. 5(c) and FIG. 5(d) show the straight swimming path of the robotic fish optimized by the method of the present invention. It can be seen intuitively that the path recorded by the global vision system is approximately a straight line with minimal fluctuations. Also, under the requirement of ensuring that the speed does not decrease, the energy has been well preserved.

A motion control system for a biomimetic robotic fish based on an adversarial structured control according to a second embodiment of the present invention includes a path acquisition module, a servomotor global control module, a servomotor compensation control module, a servomotor control quantity acquisition module, and a motion control module.

The path acquisition module is configured to obtain a swimming path of the biomimetic robotic fish, and divides the swimming path into a set of basic subpaths connected sequentially.

The servomotor global control module is configured to obtain a global control quantity of each servomotor of the biomimetic robotic fish at a time t through a trained servomotor global control model based on a start point and an end point of each subpath in the set of subpaths in sequence.

The servomotor compensation control module is configured to obtain a compensation control quantity of each servomotor of the biomimetic robotic fish at the time t through a trained servomotor compensation control model based on obtained position and pose information of the biomimetic robotic fish at the time t and the global control quantity of each servomotor of the biomimetic robotic fish at the time t.

The servomotor control quantity acquisition module is configured to sum the global control quantity of each servomotor of the biomimetic robotic fish at the time t and the compensation control quantity of each servomotor of the biomimetic robotic fish at the time t, to obtain a control quantity of each servomotor of the biomimetic robotic fish at a time t+1.

The motion control module is configured to perform a motion control on the biomimetic robotic fish at the time t+1 through the control quantity of each servomotor of the biomimetic robotic fish at the time t+1.

Those skilled in the art can clearly understand that for the convenience and conciseness of the description, the specific working process and related description of the above-mentioned system can refer to the corresponding process in the embodiment of the above-mentioned method, and will not be repeated here.

It should be noted that the motion control system for a biomimetic robotic fish based on an adversarial structured control provided by the above embodiments is illustrated only by the division of the above-mentioned functional modules. In practical applications, the above-mentioned functions can be allocated to different functional modules according to the needs, that is, the modules or steps in the embodiment of the present invention can be further decomposed or combined, for example, the modules of the above-mentioned embodiment can be combined into one module or further divided into multiple submodules to complete all or part of the above-mentioned functions. The designations of the modules and steps involved in the embodiment of the present invention are only for the purpose of distinguishing these modules or steps, and should not be construed as an improper limitation to the present invention.

According to the third embodiment of the present invention, a storage device is provided, wherein a plurality of programs are stored in the storage device, and the programs are configured to be loaded and executed by a processor to implement the above-mentioned motion control method for the biomimetic robotic fish based on the adversarial structured control.

A processing device according to the fourth embodiment of the present invention includes a processor and a storage device. The processor is configured to execute a plurality of programs. The storage device is configured to store the plurality of programs. The programs are configured to be loaded and executed by a processor to implement the above-mentioned motion control method for the biomimetic robotic fish based on the adversarial structured control.

Those skilled in the art can clearly understand that for the convenience and conciseness of the description, the specific working process and related description of the above-mentioned storage device and processing device can refer to the corresponding process in the embodiment of the above-mentioned method, and will not be repeated here.

Those skilled in the art should be able to realize that the modules and method steps of each example described in combination with the embodiments disclosed herein can be implemented by electronic hardware, computer software or a combination of the two, and the programs corresponding to the software modules and method steps can be stored in a random access memory (RAM), a memory, a read-only memory (ROM), an electrically programmable ROM, an electrically-erasable programmable ROM, a register, a hard disk, a removable disk, a Compact Disc-ROM (CD-ROM), or any other form of storage medium well known in the technical field. In order to clearly illustrate the interchangeability of electronic hardware and software, the compositions and steps of each example have been functionally described in general in the above-mentioned description. Whether these functions are implemented by electronic hardware or software depends on the specific application and design specifications and constraints of the technical solution. Those skilled in the art may use different methods to realize the described functions for each specific application, but such implementation shall not be considered beyond the scope of the present invention.

The terms "first", "second" and the like are used to distinguish similar objects, rather than to describe or indicate a particular sequence or order.

The term "include/comprise" or any other similar term is intended to cover non-exclusive inclusion so that a process, method, object or device/system that includes a set of elements includes not only those elements, but also other elements not specifically listed or inherent in the process, method, object or device/system.

Hereto, the technical solutions of the present invention have been described in combination with the preferred embodiments shown in the drawings. However, those skilled in the art can easily understand that the scope of protection of the present invention is not limited to these specific embodiments. Without deviating from the principle of the present invention, those skilled in the art can make equivalent modifications or substitutions to the relevant technical features, and the technical solutions obtained by these modifications or substitutions would fall within the scope of protection of the present invention.

What is claimed is:

1. A motion control method for a biomimetic robotic fish based on an adversarial structured control, comprising:
    step S10, obtaining a swimming path of the biomimetic robotic fish, and dividing the swimming path into a set of subpaths, wherein the set of subpaths is connected sequentially;
    step S20, based on a start point and an end point of each subpath in the set of subpaths in sequence, obtaining a global control quantity of each servomotor of the biomimetic robotic fish at a time t through a trained servomotor global control model;
    step S30, based on obtained position and pose information of the biomimetic robotic fish at the time t and the global control quantity of the each servomotor of the biomimetic robotic fish at the time t, obtaining a compensation control quantity of the each servomotor of the biomimetic robotic fish at the time t through a trained servomotor compensation control model;
    step S40, summing the global control quantity of the each servomotor of the biomimetic robotic fish at the time t and the compensation control quantity of the each servomotor of the biomimetic robotic fish at the time t, to obtain a control quantity of the each servomotor of the biomimetic robotic fish at a time t+1, wherein the control quantity of the each servomotor is a sum of the global control quantity of the each servomotor and the compensation control quantity of the each servomotor, and performing a motion control on the biomimetic robotic fish at the time t+1 through the control quantity of the each servomotor of the biomimetic robotic fish at the time t+1; and
    step S50, letting t=t+1, and returning to step S20 until the biomimetic robotic fish reaches an end of the swimming path.

2. The motion control method according to claim 1, wherein the trained servomotor global control model comprises a set of servomotor global control submodels, and the trained servomotor compensation control model comprises a set of servomotor compensation control submodels, wherein the set of servomotor global control submodels and the set of servomotor compensation control submodels are constructed for different types of subpaths, and the set of servomotor global control submodels are in a one-to-one correspondence with the set of servomotor compensation control submodels.

3. The motion control method according to claim 2, wherein the servomotor global control submodels are constructed based on a central pattern generator (CPG) model; the servomotor compensation control submodels are constructed based on a deep deterministic policy gradient (DDPG) network; the servomotor global control submodels and the servomotor compensation control submodels are trained by an iterative adversarial method, and the iterative adversarial method comprises:
   step B10, constructing an optimization objective function of the servomotor global control submodels and the servomotor compensation control submodels;
   step B20, optimizing parameters of the servomotor global control submodels by an ES algorithm according to a predetermined gradient descent direction of a first gradient function, until a value of the optimization objective function does not increase or an increased value of the optimization objective function is lower than a predetermined first threshold value, to obtain a first servomotor global control submodel;
   step B30, based on parameters of the first servomotor global control submodel, optimizing parameters of an action strategy network and an action value network in the servomotor compensation control submodels according to a predetermined gradient descent direction of a second gradient function, until the value of the optimization objective function does not increase or the increased value of the optimization objective function is lower than the predetermined first threshold value, to obtain a first servomotor compensation control submodel; and
   step B40, based on the parameters of the first servomotor compensation control submodel, returning to step B20 to iteratively optimize the parameters of the servomotor global control submodels and the servomotor compensation control submodels, until the value of the optimization objective function does not increase or the increased value of the optimization objective function is lower than the predetermined first threshold value, to obtain trained servomotor global control submodels and trained servomotor compensation control submodels.

4. The motion control method according to claim 3, wherein the optimization objective function is expressed as:

$$\max J_\psi = \cos(\theta_e) \cdot \vec{v}_m - \beta \cdot \vec{\tau} \cdot \dot{\vec{\theta}}_j', \ s.t. \|\vec{v}_m\| \le v_0;$$

wherein, $\psi$ represents an object optimized by the optimization objective function, namely a parameter of the CPG model and a parameter of the DDPG network; $\theta_e$ represents a yaw angle between the biomimetic robotic fish and a target point, and $\theta_e \in (-\pi, \pi]$ is a predetermined range of the yaw angle; $\vec{v}_m$ represents a velocity vector of the biomimetic robotic fish under a world reference system; $\|\vec{v}_m\|$ represents a modulus of the velocity vector, $v_0$ is a predetermined velocity upper limit, wherein the predetermined velocity upper limit is configured to ensure an effect of energy consumption optimization; $\tau$ represents a torque vector of the each servomotor of the biomimetic robotic fish and $\dot{\vec{\theta}}_j$ represents an angular velocity vector of the each servomotor of the biomimetic robotic fish; $\beta$ is a positive value and $\beta$ the indicates a correlation coefficient between reward and loss.

5. The motion control method according to claim 3, wherein the first gradient function is expressed as:

$$\nabla_\theta E_{E \sim N(0,I)} F(\theta + \sigma \varepsilon) = \frac{1}{\sigma} E_{E \sim N(0,I)} \{F(\theta + \sigma \varepsilon) \varepsilon\};$$

wherein, F(•) represents the optimization objective function, $\theta$ represents a parameter of the CPG model, $\sigma$ represents a step size of parameter perturbation, $\varepsilon$ represents a gradient direction of the parameter perturbation, and $E_{E \sim N(0,I)}$ represents a mathematical expectation of the optimization objective function, wherein the mathematical expectation is obtained by a motion of the biomimetic robotic fish, the motion is under a control of $\theta$, the $\theta$ is updated in n gradient directions, and the n gradient directions are sampled from a standard normal distribution.

6. The motion control method according to claim 3, wherein the second gradient function is expressed as:

$$\nabla_{\theta^\mu} J \approx \frac{1}{N} \sum_i \nabla_a Q(s, a|\theta^Q)|_{s=s_i, a=\mu(s_i)} \nabla_{\theta^\mu} \mu(s|\theta^\mu)|_{s_i};$$

wherein, $Q(s,a|\theta^Q)$ represents an action state value function, $\mu(s|\theta^\mu)$ represents an action strategy function, N represents a number of samples in a batch update method, i represents an $i^{th}$ sample, wherein the $i^{th}$ sample is sampled from an experience pool, a represents the compensation control quantity of the each servomotor, $S_i$ represents a state of the $i^{th}$ sample, J represents an objective function of the action strategy network, and $\nabla_{\theta^\mu}$ represents a gradient of the action strategy network with respect to the parameters in the action strategy network.

7. The motion control method according to claim 3, wherein a formula of implementing said summing the global control quantity of the each servomotor of the biomimetic robotic fish at the time t and the compensation control quantity of the each servomotor of the biomimetic robotic fish at the time t in step S40 is:

$$a_t = u_t^s + u_t^e = a_t^g(s_t, s_t^d) + a_t^c(s_t, s_t^d);$$

wherein, $a_t$ represents a control signal of the each servomotor of the biomimetic robotic fish, $s_t$ and $s_t^d$ represent a state and an expected state of the biomimetic robotic fish at the time t, respectively, and $a_t^g(s_t, s_t^d)$ and $a_t^c(s_t, s_t^d)$ respectively represent the global control quantity of the each servomotor and the compensation control quantity of the each servomotor related to a state of the biomimetic robotic fish.

8. A motion control system for a biomimetic robotic fish based on an adversarial structured control, comprising a path acquisition module, a servomotor global control module, a servomotor compensation control module, a servomotor control quantity acquisition module, and a motion control module; wherein
   the path acquisition module is configured to obtain a swimming path of the biomimetic robotic fish, and the path acquisition module divides the swimming path into a set of subpaths, wherein the set of subpaths is connected sequentially;

the servomotor global control module is configured to obtain a global control quantity of each servomotor of the biomimetic robotic fish at a time t through a trained servomotor global control model based on a start point and an end point of each subpath in the set of subpaths in sequence;

the servomotor compensation control module is configured to obtain a compensation control quantity of the each servomotor of the biomimetic robotic fish at the time t through a trained servomotor compensation control model based on obtained position and pose information of the biomimetic robotic fish at the time t and the global control quantity of the each servomotor of the biomimetic robotic fish at the time t;

the servomotor control quantity acquisition module is configured to sum the global control quantity of the each servomotor of the biomimetic robotic fish at the time t and the compensation control quantity of the each servomotor of the biomimetic robotic fish at the time t, to obtain a control quantity of the each servomotor of the biomimetic robotic fish at a time t+1; and the motion control module is configured to perform a motion control on the biomimetic robotic fish at the time t+1 through the control quantity of the each servomotor of the biomimetic robotic fish at the time t+1.

9. A storage device, wherein a plurality of programs are stored in the storage device, and the plurality of programs are configured to be loaded and executed by a processor to implement the motion control method according to claim 1.

10. The storage device according to claim 9, wherein the servomotor global control model comprises a set of servomotor global control submodels, and the servomotor compensation control model comprises a set of servomotor compensation control submodels, wherein the set of servomotor global control submodels and the set of servomotor compensation control submodels are constructed for different types of subpaths, and the set of servomotor global control submodels are in a one-to-one correspondence with the set of servomotor compensation control submodels.

11. The storage device according to claim 10, wherein the servomotor global control submodels are constructed based on a central pattern generator (CPG) model; the servomotor compensation control submodels are constructed based on a deep deterministic policy gradient (DDPG) network; the servomotor global control submodels and the servomotor compensation control submodels are trained by an iterative adversarial method, and the iterative adversarial method comprises:

step B10, constructing an optimization objective function of the servomotor global control submodels and the servomotor compensation control submodels;

step B20, optimizing parameters of the servomotor global control submodels by an ES algorithm according to a predetermined gradient descent direction of a first gradient function, until a value of the optimization objective function does not increase or an increased value of the optimization objective function is lower than a predetermined first threshold value, to obtain a first servomotor global control submodel;

step B30, based on parameters of the first servomotor global control submodel, optimizing parameters of an action strategy network and an action value network in the servomotor compensation control submodels according to a predetermined gradient descent direction of a second gradient function, until the value of the optimization objective function does not increase or the increased value of the optimization objective function is lower than the predetermined first threshold value, to obtain a first servomotor compensation control submodel; and step B40, based on the parameters of the first servomotor compensation control submodel, returning to step B20 to iteratively optimize the parameters of the servomotor global control submodels and the servomotor compensation control submodels, until the value of the optimization objective function does not increase or the increased value of the optimization objective function is lower than the predetermined first threshold value, to obtain trained servomotor global control submodels and trained servomotor compensation control submodels.

12. The storage device according to claim 11, wherein the optimization objective function is expressed as:

$$\max J_\psi = \cos(\theta_e) \cdot \vec{v}_m - \beta \cdot \vec{\tau} \cdot \vec{\dot{\theta}}_j, \ s.t. \|\vec{v}_m\| \le v_0;$$

wherein, $\psi$ represents an object optimized by the optimization objective function, namely a parameter of the CPG model and a parameter of the DDPG network; $\theta_e$ represents a yaw angle between the biomimetic robotic fish and a target point, and $\theta_e \in (-\pi, \pi]$ is a predetermined range of the yaw angle; $\vec{v}_m$ represents a velocity vector of the biomimetic robotic fish under a world reference system; $\|\vec{v}_m\|$ represents a modulus of the velocity vector, $v_0$ is a predetermined velocity upper limit, wherein the predetermined velocity upper limit is configured to ensure an effect of energy consumption optimization; $\vec{\tau}$ and $\dot{\theta}_j$ represent a torque vector and an angular velocity vector of the each servomotor of the biomimetic robotic fish, respectively; $\beta$ is a positive value and the $\beta$ indicates a correlation coefficient between reward and loss.

13. The storage device according to claim 11, wherein the first gradient function is expressed as:

$$\nabla_\theta E_{E \sim N(0,I)} F(\theta + \sigma\varepsilon) = \frac{1}{\sigma} E_{E \sim N(0,I)} \{F(\theta + \sigma\varepsilon)\varepsilon\};$$

wherein, $F(\bullet)$ represents the optimization objective function, $\theta$ represents the parameter of the CPG model, $\sigma$ represents a step size of parameter perturbation, $\varepsilon$ represents a gradient direction of the parameter perturbation, and $E_{E \sim N(0,I)}$ represents a mathematical expectation of the optimization objective function, wherein the mathematical expectation is obtained by a motion of the biomimetic robotic fish, the motion is under a control of $\theta$, the $\theta$ is updated in n gradient directions, and the n gradient directions are sampled from a standard normal distribution.

14. The storage device according to claim 11, wherein the second gradient function is expressed as:

$$\nabla_{\theta^\mu} J \approx \frac{1}{N} \sum_i \nabla_a Q(s, a|\theta^Q)|_{s=s_i, a=\mu(s_i)} \nabla_{\theta^\mu} \mu(s|\theta^\mu)|_{s_i};$$

wherein, $Q(s,a|\theta^Q)$ represents an action state value function, $\mu(s|\theta^\mu)$ represents an action strategy function, N represents a number of samples in a batch update method, i represents an $i^{th}$ sample, wherein the $i^{th}$ sample is sampled from an experience pool, a represents the compensation control quantity of the each servomotor, $S_i$ represents a state of the $i^{th}$ sample, J represents an objective function of the action strategy network, and $\nabla_{\theta^\mu}$ represents a gradient of the action strategy network with respect to the parameters in the action strategy network.

15. The storage device according to claim 11, wherein a formula of implementing said summing the global control quantity of the each servomotor of the biomimetic robotic fish at the time t and the compensation control quantity of the each servomotor of the biomimetic robotic fish at the time t in step S40 is:

$$a_t = u_t^s + u_t^e = a_t^g(s_t, s_t^d) + a_t^c(s_t, s_t^d);$$

wherein, $a_t$ represents a control signal of the each servomotor of the biomimetic robotic fish, $s_t$ and $s_t^d$ represent a state and an expected state of the biomimetic robotic fish at the time t, respectively, and $a_t^g(s_t, s_t^d)$ and $a_t^c(s_t, s_t^d)$ respectively represent the global control quantity of the each servomotor and the compensation control quantity of the each servomotor related to a state of the biomimetic robotic fish.

16. A processing device, comprising
a processor, wherein the processor is configured to execute a plurality of programs; and
a storage device, wherein the storage device is configured to store the plurality of programs;
wherein the plurality of programs are configured to be loaded and executed by the processor to implement the motion control method according to claim 1.

17. The processing device according to claim 16, wherein the servomotor global control model comprises a set of servomotor global control submodels, and the servomotor compensation control model comprises a set of servomotor compensation control submodels, wherein the set of servomotor global control submodels and the set of servomotor compensation control submodels are constructed for different types of subpaths, and the set of servomotor global control submodels are in a one-to-one correspondence with the set of servomotor compensation control submodels.

18. The processing device according to claim 17, wherein the servomotor global control submodels are constructed based on a central pattern generator (CPG) model; the servomotor compensation control submodels are constructed based on a deep deterministic policy gradient (DDPG) network; the servomotor global control submodels and the servomotor compensation control submodels are trained by an iterative adversarial method, and the iterative adversarial method comprises:

step B10, constructing an optimization objective function of the servomotor global control submodels and the servomotor compensation control submodels;

step B20, optimizing parameters of the servomotor global control submodels by an ES algorithm according to a predetermined gradient descent direction of a first gradient function, until a value of the optimization objective function does not increase or the increased value of the optimization objective function is lower than a predetermined first threshold value, to obtain a first servomotor global control submodel;

step B30, based on parameters of the first servomotor global control submodel, optimizing parameters of an action strategy network and an action value network in the servomotor compensation control submodels according to a predetermined gradient descent direction of a second gradient function, until the value of the optimization objective function does not increase or the increased value of the optimization objective function is lower than the predetermined first threshold value, to obtain a first servomotor compensation control submodel; and step B40, based on the parameters of the first servomotor compensation control submodel, returning to step B20 to iteratively optimize the parameters of the servomotor global control submodels and the servomotor compensation control submodels, until the value of the optimization objective function does not increase or the increased value of the optimization objective function is lower than the predetermined first threshold value, to obtain trained servomotor global control submodels and trained servomotor compensation control submodels.

19. The processing device according to claim 18, wherein the optimization objective function is expressed as:

$$\max J_\psi = \cos(\theta_e) \cdot \vec{v}_m - \beta \cdot \vec{\tau} \cdot \dot{\vec{\theta}}_j, \quad s.t. \|\vec{v}_m\| \leq v_0;$$

wherein, $\psi$ represents an object optimized by the optimization objective function, namely a parameter of the CPG model and a parameter of the DDPG network; $\theta_e$ represents a yaw angle between the biomimetic robotic fish and a target point, and $\theta_e \in (-\pi, \pi]$ is a predetermined range of the yaw angle; $\vec{v}_m$ represents a velocity vector of the biomimetic robotic fish under a world reference system; $\|\vec{v}_m\|$ represents a modulus of the velocity vector, $v_0$ is a predetermined velocity upper limit, wherein the predetermined velocity upper limit is configured to ensure an effect of energy consumption optimization; $\tau$ represents a torque vector of the each servomotor of the biomimetic robotic fish and $\dot{\theta}_j$ represents an angular velocity vector of the servomotor of the biomimetic robotic fish, respectively; $\beta$ is a positive value and the $\beta$ indicates a correlation coefficient between reward and loss.

20. The processing device according to claim 18, wherein the first gradient function is expressed as:

$$\nabla_\theta E_{E \sim N(0,I)} F(\theta + \sigma \varepsilon) = \frac{1}{\sigma} E_{E \sim N(0,I)} \{F(\theta + \sigma \varepsilon) \varepsilon\};$$

wherein, F(•) represents the optimization objective function, $\theta$ represents the parameter of the CPG model, $\sigma$ represents a step size of parameter perturbation, $\varepsilon$ represents a gradient direction of the parameter perturbation, and $E_{E \sim N(0,I)}$ represents a mathematical expectation of the optimization objective function, wherein the mathematical expectation is obtained by a motion of the biomimetic robotic fish, the motion is under a control of $\theta$, the $\theta$ is updated in n gradient directions, and the n gradient directions are sampled from a standard normal distribution.

* * * * *